United States Patent [19]

Kaliszewski

[11] Patent Number: 5,613,532
[45] Date of Patent: Mar. 25, 1997

[54] COMPRESSED NATURAL GAS (CNG) REFUELING STATION TANK DESIGNED FOR VEHICLES USING CNG AS AN ALTERNATIVE FUEL

[75] Inventor: Charles R. Kaliszewski, Wadsworth, Ohio

[73] Assignee: The Babcock & Wilcox Company, New Orleans, La.

[21] Appl. No.: 412,816

[22] Filed: Mar. 29, 1995

[51] Int. Cl.$^6$ .................................................. B65B 31/00
[52] U.S. Cl. ................... 141/18; 141/98; 141/236; 222/3; 206/0.6; 220/565; 48/190
[58] Field of Search ...................... 141/1, 2, 3, 4, 141/18, 21, 98, 197, 236; 48/190; 222/3; 206/0.6; 220/565, 566; 29/890.053; 72/369; 123/525–527

[56] References Cited

U.S. PATENT DOCUMENTS

| | | | |
|---|---|---|---|
| 867,942 | 10/1907 | Bobrick | 222/3 X |
| 1,182,460 | 5/1916 | Cruger | 222/3 X |
| 1,339,431 | 5/1920 | Backhaus | 141/4 |
| 1,916,758 | 7/1933 | George | 222/3 X |
| 2,260,356 | 10/1941 | White | 220/565 X |
| 2,359,219 | 9/1944 | Jones | 123/567 |
| 2,746,727 | 5/1956 | Earl, Jr. | 29/890.053 X |
| 3,304,963 | 2/1967 | Greenlee | 141/4 |
| 3,982,406 | 9/1976 | Hanson et al. | 62/339 |
| 4,102,169 | 7/1978 | Koser | 72/369 X |
| 4,177,661 | 12/1979 | Schwarzbach et al. | 72/369 X |
| 4,501,253 | 2/1985 | Gerstmann et al. | 123/527 |
| 4,531,558 | 7/1985 | Engel et al. | 141/44 |
| 4,542,774 | 9/1985 | Stavlo | 141/1 |
| 4,749,384 | 6/1988 | Nowobilski et al. | 55/27 |
| 4,805,674 | 2/1989 | Knowlton | 141/47 |
| 4,817,855 | 4/1989 | Bunkoczy | 220/566 X |
| 4,987,932 | 1/1991 | Pierson | 141/1 |
| 5,207,530 | 5/1993 | Brooks et al. | 405/53 |
| 5,211,021 | 5/1993 | Pierson | 62/50.2 |
| 5,238,030 | 8/1993 | Miller et al. | 141/4 |
| 5,253,682 | 10/1993 | Haskett et al. | 141/3 |
| 5,259,424 | 11/1993 | Miller et al. | 141/4 |
| 5,284,041 | 2/1994 | Christensen et al. | 72/369 X |
| 5,302,090 | 4/1994 | Schoo | 417/379 |
| 5,315,831 | 5/1994 | Goode et al. | 62/7 |
| 5,315,845 | 5/1994 | Lee | 62/338 |
| 5,327,730 | 7/1994 | Myers et al. | 62/9 |
| 5,330,031 | 7/1994 | Hill et al. | 180/271 |
| 5,350,442 | 9/1994 | Thelen et al. | 95/115 |
| 5,351,726 | 10/1994 | Diggins | 141/4 |
| 5,373,700 | 12/1994 | McIntosh | 123/527 X |
| 5,406,988 | 4/1995 | Hopkins | 141/2 |
| 5,421,160 | 6/1995 | Gustafson et al. | 123/525 X |

*Primary Examiner*—J. Casimer Jacyna
*Attorney, Agent, or Firm*—Daniel S. Kalka; Robert J. Edwards

[57] ABSTRACT

A compressed natural gas refueling station tank comprises an elongated tubular body having a diameter of about 8 to 10 inches and a length of 50 feet or more. The tank is bent into a serpentine shape to produce a compact configuration which can be stacked with other like tanks and connected to a compressor through a manifold.

9 Claims, 1 Drawing Sheet

COMPRESSED NATURAL GAS (CNG) REFUELING STATION TANK DESIGNED FOR VEHICLES USING CNG AS AN ALTERNATIVE FUEL

BACKGROUND OF THE INVENTION

1. Field of the Invention

The present invention relates, in general, to the storage and transport of compressed natural gas, and in particular, to a new and useful tank design for a refueling station for refueling vehicles using compressed natural gas (CNG).

2. Description of the Related Art

The following patents are relevant in the field of the present invention:

U.S. Pat. No. 5,351,726 entitled "System and Method For Compressing Natural Gas and For Refueling Motor Vehicles"; U.S. Pat. No. 5,211,021 entitled "Apparatus for Rapidly Filling Pressure Vessels With Gas"; U.S. Pat. No. 5,207,530 entitled "Underground Compressed Natural Gas Storage and Service System"; U.S. Pat. No. 4,987,932 entitled "Process and Apparatus for Rapidly Filling a Pressure Vessel With Gas"; U.S. Pat. No. 4,531,558 entitled "Gaseous Fuel Refueling Apparatus"; U.S. Pat. No. 5,350,442 entitled "Gas Handling System and Adsorbent Dryer Regeneration Apparatus"; U.S. Pat. No. 5,330,031 entitled "Alternative Fuel System For Powered Industrial Vehicle"; U.S. Pat. No. 5,315,831 entitled "Liquid Natural Gas and Compressed Natural Gas Total Fueling System"; U.S. Pat. No. 5,302,090 entitled "Method and Apparatus for the Utilization of the Energy Stored In a Gas Pipeline; U.S. Pat. No. 5,259,424 entitled "Method and Apparatus for Dispensing Natural Gas"; U.S. Pat. No. 5,327,730 entitled "Method and Apparatus for Liquifying Natural Gas For Fuel For Vehicles and Fuel Tank For Use Therewith; U.S. Pat. No. 5,238,030 entitled "Method and Apparatus for Dispensing Natural Gas; U.S. Pat. No. 5,253,682 entitled "Free Piston Gas Delivery Apparatus and Method"; U.S. Pat. No. 4,805,674 entitled "Natural Gas Storage and Retrieval System"; U.S. Pat. No. 4,749,384 entitled "Method and Apparatus for Quick Filling Gas Cylinders; and U.S. Pat. No. 4,501,253 entitled "On-Board Automotive Methane Compressor".

None of these patents disclose the specific arrangement and size of a refueling station tank designed according to the present invention.

The National Energy Policy Act of 1992 and the Clean Air Act Amendments of 1990 require fleet managers to purchase OEM vehicles or convert existing vehicles to run on alternative fuels. To help create demand, an increasing percentage of Federal and State-owned vehicles must be converted annually over the next five years to reduce dependence on foreign oil, and provide cleaner emissions.

Compressed Natural Gas (CNG) is the preferred alternative fuel in at least 35 states.

One of the most significant obstacles to increased use of alternative fuels is the lack of an infrastructure for refueling. Initial efforts are being placed on centrally housed and refueled fleets, such as those owned by government installations and industries such as utilities. Preference and significant tax incentives are given to establishing a network of privately operated refueling stations to allow wider use and acceptance of alternative fuel vehicles (AFVs). Federal and state government entities are encouraged to commit to refueling contracts with private firms to immediately provide a known level of demand.

With limited range, CNG AFVs are confined to "local" use. An expanded network of refueling stations will allow extended traveling range, and greater acceptance of CNG AFVs.

Initially, refueling stations consisted of a bank of Department of Transportation (DOT) cylinders. This soon gave way to use of a series of American Society of Mechanical Engineers (ASME) pressure vessels 16, 20, or 24 inches in diameter, and 16 to 30 feet long. Pressure is held at 5,000 psi at ambient temperature. (Pressure of the vehicle's tanks are 2,400, 3,000, or 3,600 psi.) Large installations call for storage of 40,000 to 60,000 standard cubic feet of CNG.

CNG can be stored in either bulk storage or cascade storage. Bulk storage is accomplished by either one large tank or several smaller tanks manifolded together. As CNG is drawn from the tank(s), all tanks draw down in pressure at the same rate.

Cascade storage provides more available CNG than does bulk storage for the same size containers. There are usually three or four banks of vessels in a cascade. A vehicle is fueled from the first bank. If there is insufficient CNG at the proper pressure in the first bank, the vehicle's tank is topped off successively from the second and subsequent banks. If necessary, the vehicle can be topped off directly from the compressor.

SUMMARY OF THE INVENTION

The subject invention is directed to a low volume, high pressure storage system of compressed natural gas (CNG) for refueling vehicles at commercially zoned sites. The present invention reduces the diameter of the storage vessel to 8 inches while extending its length to 40 feet and bending it in a serpentine configuration similar to a superheater section of a boiler. The vessels could be stacked horizontally, separated and supported by spacer castings similar to those used to separate tubes in a boiler (such as B&W's split ring castings). The present invention allows for a smaller volume of CNG to be stored while maintaining the necessary pressure to refill a vehicle's tank. The versatility of this system allows it be easily expandable as the demand for CNG increases.

A review of the above patents reveals that none of the patents teach or suggest a CNG refueling station tank design that employs tubes with a diameter of 8–10 inches OD with lengths extending to 40 feet that are bent and stackable in a configuration similar to a superheater section.

The purpose of the invention is to provide low volume, high pressure storage CNG for refueling vehicles at commercially zoned sites usually located adjacent to residential zones. The invention also addresses the siting restrictions of utilizing tanks 25 to 30 feet long.

The invention aims to use existing core skills of the boiler industry and minimize the capital investment needed to fabricate the newly-designated tank.

The invention calls for reducing the diameter of the vessel to 8 inches, extending its length to forty feet, and bending it in a serpentine configuration similar to a superheater section of a boiler. Several vessels would be stacked horizontally, separated and supported by split ring castings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
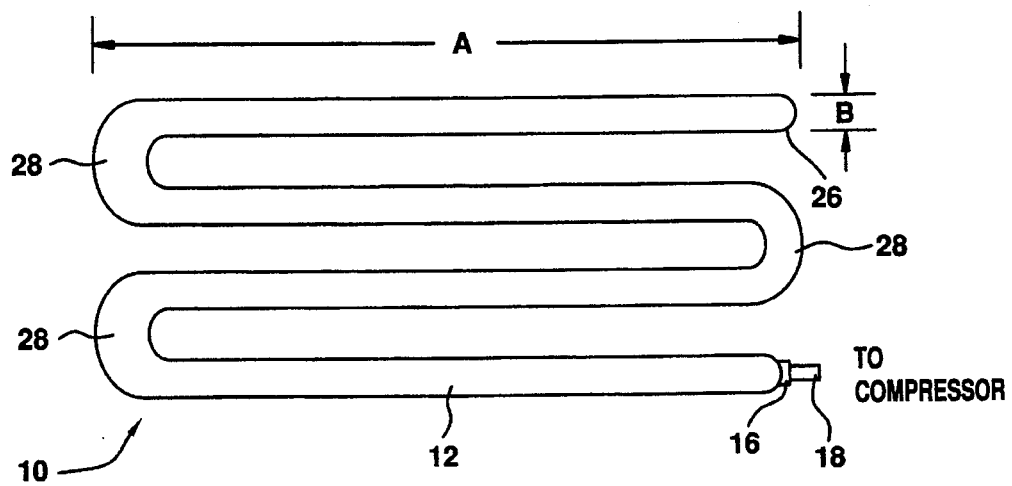
FIG. 1 is a top plan view of a compressed natural gas refilling station tank of the present invention.
Figure 2:
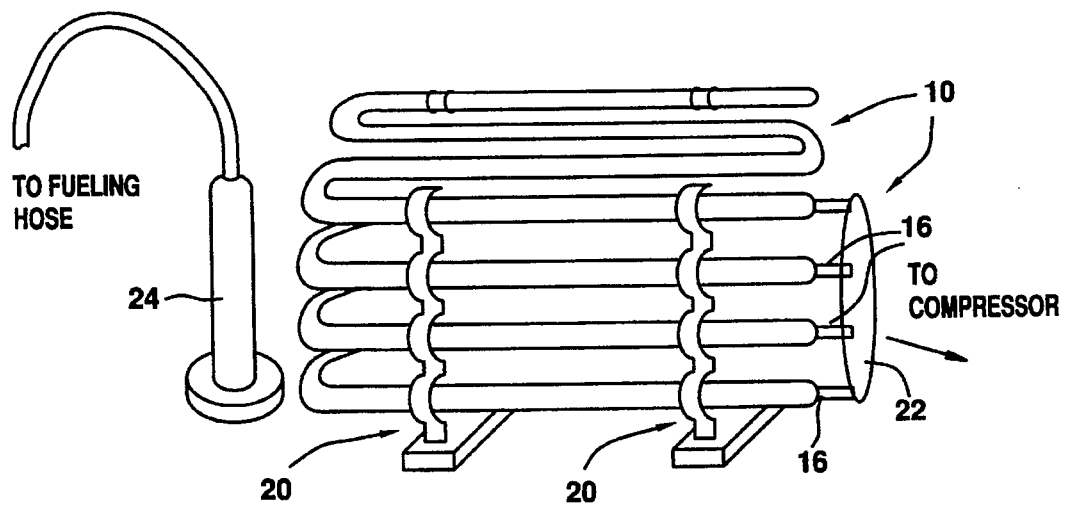
FIG. 2 is a perspective view of a stack of tanks according to the present invention comprising the station inventory of tanks for use in refueling CNG vehicles.

Referring to the drawings, the invention embodied therein comprises at least one, but preferably a bank of tanks generally designated 10, each comprising a tubular structure 12 having a diameter B of about 8 to 10 inches (OD), and a serpentine shape having an overall compact dimension A, generally less than 10 feet, but a linear extent from one end of the serpentine tube 12 to the other, of 40 feet or 30 feet or more. As shown in FIG. 2, split ring supports generally designated 20 can be used to stack a plurality of individual tanks 10, one above the other.

Each tank has an inlet/outlet fitting 16 which can be connected by a conduit 18 to a compressor designed for compressed natural gas supply. As shown in FIG. 2, a manifold 22 is connected to each of the connections 16, for attaching the tanks to the compressor. A fuel hose attachment 24 which communicates with the compressor can be engaged to CNG vehicles, for filling the vehicles with fuel. Although a parallel or bulk storage arrangement is shown in FIG. 2, providing valves within the manifold 22 can readily produce a cascade storage arrangement.

Although as shown in FIG. 2, tank 10 with its full 40 foot length is bent into a serpentine shape having four straight lengths, one of which carries the connector 16 and the other of which, at 26, is closed, with three 180° bends 28 between the lengths, other serpentine shapes can be selected. Further, although FIG. 2 shows a horizontal position for the stacked serpentine tanks 10, the tanks can also be arranged vertically, one next to the other, to produce the bank of tanks.

While a specific embodiment of the invention has been shown and described in detail to illustrate the application of the principles of the invention, it will be understood that the invention may be embodied otherwise without departing from such principles.

Although the initial application is the storage of compressed natural gas, it will be understood that the invention could be used for fuels of different chemistry such as propane.

What is claimed is:

1. A compressed natural gas refueling station comprising:
    a plurality of serpentine tanks, each serpentine tank having an elongated tubular tank body having a diameter of about 8 to 10 inches and a length of greater than 30 feet, the tubular body being bent into a serpentine compact shape and constructed to provide a low-volume, high-pressure storage for compressed natural gas, each of said serpentine tanks further having a connector connected to one end of each serpentine tank for receiving and discharging compressed natural gas, said serpentine tanks being constructed for a stacked arrangement with a split ring support for supporting each tank separating one from the other.

2. A station according to claim 1, wherein said plurality of said tanks are stacked one next to the other.

3. A station according to claim 1, including a manifold connected to the connector of all said tanks.

4. A station according to claim 1, wherein said plurality of tanks are stacked one above the other.

5. A compressed natural gas refueling station comprising:
    a plurality of serpentine tanks, each serpentine tank having an elongated tubular tank body having a diameter of about 8 to 10 inches and a length of greater than 30 feet, the tubular body being bent into a serpentine compact shape having a plurality of straight sections connected by a plurality of bend sections, the bend sections and straight sections lying in a common plane, and constructed to provide a low-volume, high-pressure storage for compressed natural gas, each of said serpentine tanks further having a connector connected to one end of each serpentine tank for receiving and discharging compressed natural gas, said serpentine tanks being constructed for a stacked arrangement with means for supporting each tank separating one from the other.

6. A station according to claim 5, wherein said plurality of said tanks are stacked one next to the other.

7. A station according to claim 5, including a manifold connected to the connector of all said tanks.

8. A station according to claim 5, wherein said plurality of tanks are stacked one above the other.

9. A station according to claim 5, wherein said means for supporting each tank comprises a split ring support.

\* \* \* \* \*